United States Patent [19]

La Cava et al.

[11] 3,875,890
[45] Apr. 8, 1975

[54] SIDE WARNING DEVICE FOR CYCLES

[76] Inventors: Carl La Cava; Dorothy L. La Cava, both of 2621 Colorado St., Allentown, Pa. 18108

[22] Filed: Feb. 6, 1973

[21] Appl. No.: 330,014

[52] U.S. Cl. ............................................. 116/28 R
[51] Int. Cl. ............................................. B60q 1/32
[58] Field of Search ............. 116/28 R, 114, 57, 56, 116/60; 350/99; 40/129 C; 301/37 R, 108, 37 L, 37 PB, 37 S, 37 TP, 37 SC

[56] References Cited
UNITED STATES PATENTS

| | | | |
|---|---|---|---|
| 1,455,306 | 5/1923 | Reilley et al. | 350/99 |
| 1,637,160 | 7/1927 | Rapeport | 301/37 S |
| 1,647,651 | 11/1927 | Mullan | 350/99 |
| 2,151,485 | 3/1939 | Pawsat | 350/99 |
| 2,191,388 | 2/1940 | Hicks | 350/99 |
| 2,212,039 | 8/1940 | Lyon | 301/37 R |
| 2,244,014 | 6/1941 | Lyon | 301/37 TP |
| 3,066,986 | 12/1962 | Hollar | 301/37 SC |
| 3,123,040 | 3/1964 | Geraghty | 116/60 |
| D173,278 | 10/1954 | Lyon | 301/37 L |
| D186,163 | 9/1959 | Plotkin | 301/37 L |
| D192,418 | 3/1962 | Deesen | 301/37 PB |

*Primary Examiner*—Jerry W. Myracle
*Attorney, Agent, or Firm*—Jackson, Jackson & Chovanes

[57] ABSTRACT

A side warning device for cycles, such as bicycles and motorcycles, is attached to the axle of the cycle, so that the warning device is visible from the side of the cycle. Warning devices can be coupled on both sides of the front axle and on both sides of the rear axle, in the case of bicycles, to provide for maximum side visibility. In the case of motorcycles having obstructed rear axles, the warning device can be coupled on both sides of the front axle. The warning device can be a light reflecting medium.

5 Claims, 16 Drawing Figures

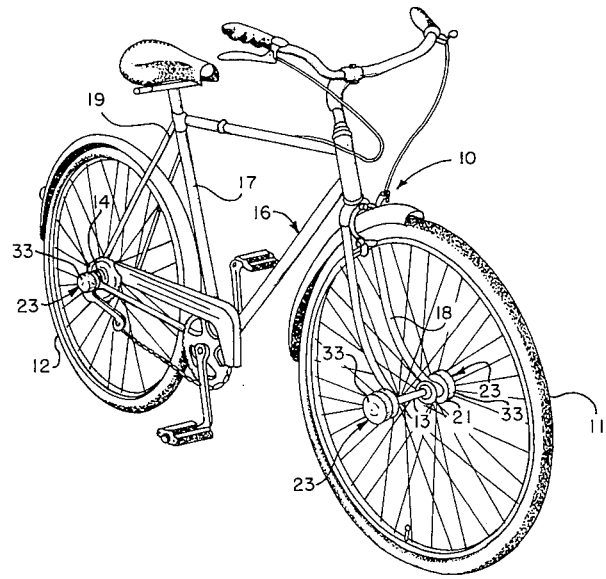

SIDE WARNING DEVICE FOR CYCLES

CROSS REFERENCE TO RELATED APPLICATION

The ornamental features of applicants' invention is claimed and shown in a design application filed by the applicants on Oct. 18, 1972.

DESCRIPTION OF INVENTION

This invention relates to new and improved warning devices for cycles, in particular relating to improved warning devices for the side of bicycles and of motorcycles.

Warning devices on cycles in the past have included:
a. A headlight visible on the front of a cycle;
b. A tail light visible on the rear of a cycle;
c. A tail reflector visible from the rear of the cycle;
d. Handlebar reflectors visible from the rear of a cycle;
e. Pedal reflectors partially visible (and possibly obscured by the foot when in use) from the front and rear of a cycle.

Cycles on the other hand, have not had any device visible from the side, creating a hazardous situation.

The National Safety Council refers to more than 850 deaths a year from accidents involving bicycles, more than those occurring on railroads.

Even though bikes are designed with care, in the past they often lack the basic safety devices such as light reflecting materials. They have front and back lights or reflectors, but it was reported that one youngster was killed at an intersection one night by a driver approaching from the side who failed to see the bike.

It is an object of this invention to provide a new and improved warning device for cycles and a new procedure for attaching the warning device to the side of a cycle.

Another object of the invention is to provide a new and improved reflective warning device which is visible from the side of a cycle.

Another object is to provide a new and improved warning device which can be coupled on to the axle in such a manner that it is visible from the side of the cycle.

In accordance with the invention, the combination includes a device for transmitting a visible warning. Means are provided for coupling the device to the axle of a cycle so that the visible warning is apparent from the side. It is important to recognize that the axle of the cycle is stationary and provides a base on which a reflector can be anchored.

In accordance with the invention, we prefer to attach reflective devices to the front and back axle on each side of the axle.

FIG. 1 is a perspective of the cycle including side warning devices in accordance with one embodiment of the invention.

FIG. 2 is a side elevation of a preferred embodiment of a warning device attached to an axle.

FIG. 3 is a top plan view of the warning device of FIG. 2.

FIG. 4 is a side elevation of a base plate without the warning device of FIG. 2.

FIG. 4a is an enlarged section of the axle structure according to FIGS. 1 to 4.

FIG. 4b is a plan view of a clasp.

FIG. 4c is a side elevation of a clasp.

FIG. 5 is a side elevation of a different embodiment of the invention.

FIG. 6 is a top plan view of FIG. 5.

FIG. 7 is a side elevation of a base plate without the reflective device of FIG. 5.

FIG. 8 is a side elevation of a base plate of a modification of the invention.

FIG. 9 is a top plan view of the device of FIG. 8.

FIG. 10 is a side elevation of a somewhat variant device of the invention.

FIG. 11 is a top plan view of the device of FIG. 10.

FIG. 12 is a side elevation of the device of FIGS. 10 and 11 without the reflective device.

FIG. 12a is an enlarged section of the axle structure according to FIGS. 10 to 12.

In the preferred embodiment, a cycle 10 of FIG. 1 includes a front wheel 11 and a rear wheel 12. The wheels 11 and 12 rotate on fixed axles 13 and 14 respectively. The cycle 10 includes a frame 16 having a main body 17 with a bifurcated portion 18 to affix the front axle 13 on both sides of the front wheel 11. There is a rear bifurcated portion 19 affixed to the rear axle 14. Nuts 21 are affixed to the outsides of the axles 13 and 14 for retaining frame 16 to the axles 13 and 14.

As best seen in FIGS. 2, 3 and 4, the side warning devices 23 include a base plate 24 having a hole 26, coupled to the axles 13 and 14 around the hole 26 by a nut 27 whereby the base plate is held on the axle by the nut 27 on each side of the frame and by a nut 21 at the inner side of the base plate.

The warning device 23 consists of a reflective device 30 attached to the side of the bicycle, and it connects to the base plate by spring clips 31 connected to a rim 32.

In the form of FIGS. 5 to 7 a warning device 23' is shown consisting of a somewhat dished base plate 24' having a hole 26, the warning device 23' connecting to the base plate by a continuous rim 33 which springs over the base plate.

The form of FIGS. 8 and 9 is somewhat similar. This has a somewhat dished base plate $24^2$ which is snapped over a rim on the reflective device $23^2$ to show a reflector 30 which is mounted out to the side and reflects light to the side.

In the form of FIGS. 10–12 the base plate $24^3$ is snapped over a rim on the reflective device $23^3$ which in turn snaps against the side nut on the axle by a spring clip 34 mounted on the base plate.

Other modifications will be apparent to those skilled in the art without departing from the spirit of the invention.

In view of our invention and disclosure, variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention, what we claim as new and desire to secure by Letters Patent is:

1. In a reflecting device for the side of a bicycle having an axle, a base plate having an axle hole through which the axle is inserted and having substantially the same area on each of four quadrants around the axle hole and having holes equidistant from the center, resilient clips which grip the base plate in the holes and a reflecting device proper having reflecting means to show the side of the bicycle and supported by the clips.

2. The invention of claim 1, in which the clips are 180° apart relative to the axle hole.

3. The invention of claim 1, in which the reflecting device proper has flutings.

4. The invention of claim 1, in which the reflecting device proper has fin members to which the reflecting material is attached.

5. In a reflecting device for a bicycle, having an axle, a dished base plate having an axle hole in the center and having substantially the same area in each direction in any four quadrants around the axle hole, terminating at the outside in a rim which is substantially curvilinear, and a reflecting device proper which is dished in reverse fashion, having reflecting means to show at the side of the bicycle, the outer edges of the reflecting device proper serving to join the base plate to the reflecting device proper.

* * * * *